United States Patent Office 3,547,762
Patented Dec. 15, 1970

3,547,762
BONDED GLASS FIBER MATS
Joseph P. Stalego, Newark, Ohio, assignor to Owens-Corning Fiberglas Corporation, a corporation of Delaware
No Drawing. Filed June 9, 1967, Ser. No. 644,813
Int. Cl. B32b 17/04; D04h 1/64
U.S. Cl. 161—170
4 Claims

ABSTRACT OF THE DISCLOSURE

Laminated glass fiber products are produced by treating glass fibers with a size containing 3,5-dimethyl-1-hexyn-3-ol, forming a mat of overlapping strands of glass fibers, bonding the fibers and strands together at their points of contact with a resinous binder containing a trimer acid as one of the essential ingredients, curing the mat, either applying a saturating resin to the mat and then forming a sandwich of mats, or forming a sandwich of mats and then applying a saturating resin to the sandwich, and then curing the sandwich by the application of heat and pressure to form a laminate.

BACKGROUND OF THE INVENTION

Field of the invention

Laminated glass fiber products, and in particular laminated glass fiber sheets which have good electrical insulating properties are used, for example, as backers for breaker panels and in many other applications where good electrical properties are desirable. These laminated products are generally made by first forming a mat of overlapping loops of glass fiber strands which are bonded together at their points of contact by a resin, then saturating the mat with another resin, forming a sandwich of mats, and thereafter curing the sandwich by the application of heat and pressure to form the laminated product. The laminate can be made in the form of a flat sheet, or molded or wound in the desired configuration. Alternately, the sandwich is formed, the saturating resin is applied, and the sandwich is then cured.

In producing a mat of the type in question, a size is conventionally applied to glass fibers as they are being formed into strands. The size is required to prevent abrasion and consequent reduction of tensile strength during handling. Since at least some of the size is present in the finished product, it is readily apparent that the dielectric strength and other electrical properties of the finished product will be affected by the nature of the size applied, as well as by the nature of the binder.

The prior art

In the prior art a binder which consisted essentially of a phenol-formaldehyde type resin has been used in the manufacture of glass fiber mats which were ultimately made into laminated glass fiber sheets. This binder was unstable, had poor shelf life, and had a tendency to build up rapidly on a conveyor chain carrying the mat through an oven for cure, thus necessitating frequent shut-downs in order to clean the conveyor chain and associated machinery. In addition, the binder was expensive.

The size which was formerly used did not give good electrical properties. This size consisted essentially of an aqueous solution of the reaction product of tetraethylenepentaamine and pelargonic acid solubilized with acetic acid, plus the reaction product of caprylic acid and tetraethylenepentaamine solubilized with acetic acid.

It is an object of this invention to provide a method of making laminated glass fiber products having desired electrical properties and which involves using the size and binder system described herein.

It is another object of this invention to provide laminated glass fiber products made with the size and binder system disclosed herein.

It is a further object of this invention to provide a new binder composition which exhibits improved binder stability and storage life and which reduces binder buildup on the oven, conveyor chain and associated apparatus.

It is another object of this invention to provide a method of making a glass fiber mat which is particularly suited for use in the production of laminated glass fiber products having desired electrical properties.

It is a still further object of this invention to provide a glass fiber mat which is particularly suited for use in the production of laminated glass fiber products having desired electrical properties.

It is a still further object of this invention to provide a new binder composition which when used with the size described herein is useful in the production of glass fiber mats used in the production of laminated glass fiber products having desired electrical properties.

These and other objects will be more fully appreciated by reference to the following detailed explanation of the invention.

SUMMARY OF THE INVENTION

The binder composition of this invention comprises an aqueous solution of (1) From 38 to 88% [1] of a synthetic resin selected from the group consisting of condensates of phenol, melamine, urea, and dicyandiamide with formaldehyde; co-condensates of phenol and urea, melamine, or dicyandiamide with formaldehyde; and phenol-formaldehyde resins extended with up to 50% of urea, melamine, dicyandiamide or mixtures thereof; and mixtures of the condensates, co-condensates and extended phenol-formaldehyde resins.

(2) From 10 to 58% of a trimer acid, (3) From $\frac{1}{10}$ to 5% of an aminoalkylsilane, and when said resins are condensed with an alkali hydroxide during formation thereof, (4) From $\frac{1}{10}$ to 2% ammonium sulfate, said binder having a pH ranging from 7.2 to 10.

In manufacturing the products of this invention the above described binder must be used in conjunction with a size which comprises an aqueous solution of:

from 20 to 98% by weight 3,5-dimethyl-1-hexyn-3-ol,
from $\frac{5}{10}$ to 40% by weight iso-octyl-phenoxy-polyoxyethylene ethanol, and
from 1 to 75% by weight of an aminoalkylsilane.

The method of this invention comprises attenuating streams of molten glass into fibers, treating the glass fibers with the above described size, forming the fibers into strands, projecting the strands onto a conveyor to form a mat of overlapping loops of glass fiber strands, treating the mat with the above described binder sys- ---
[1] Unless otherwise specified, percentages, herein, are by weight on a dry solids basis.

tem, and curing the binder. Further steps to form a laminate include saturating the mat with another resin, forming a sandwich of a plurality of mats, and curing the second resin in the sandwich by the application of heat and pressure to form a laminated glass fiber product.

Alternately, the process comprises forming a sandwich of a plurality of mats, and then applying the saturating resin to the sandwich, rather than to individual mats.

This invention will be more clearly understood by reference to the following examples. It is not intended that it be limited thereby, however.

Example I

Molten streams of glass were drawn from a multiorifice bushing which formed part of a glass melting furnace and were attenuated into fibers. The glass fibers had an average diameter of approximately 58 hundred thousandths of an inch. The fibers were pulled over a plurality of rolls, approximately 364 fibers to each roll, whereby the individual fibers were formed into strands or bundles of fibers. As the fibers were being pulled over the rolls, a size was applied thereto from the rolls. The size consisted of 48.75% 3,5-dimethyl-1-hexyn-3-ol, 2.44% iso-octyl-phenoxy-polyoxyethylene ethanol, and 48.78% gamma-aminopropyltriethoxysilane (sold by the Union Carbide Corporation under the name A–1100 Silicone) all in a water solution at a 1% concentration of the size components in the water. The size was prepared by mixing with constant agitation the above listed ingredients.

After the size was applied, the stands were laid down in substantially random manner on a moving foraminous conveyor to form a porous mat. Thereafter the mat was passed into a bath where a binder forming a part of this invention was applied to the mat. The binder consisted of an aqueous solution of:

| | Percent |
|---|---|
| Trimer acid | 24.6 |
| Phenol-formaldehyde resin [1] | 73.9 |
| Methyl cellulose | 0.66 |
| Ammonium sulfate | 0.49 |
| N-beta-(aminoethyl) - gamma-aminopropyltrimethoxysilane as a 60% solution in methanol (Z–6024 sold by Dow Corning Company) | 0.30 |

[1] The phenol-formaldehyde resin was prepared as follows. A reaction vessel equipped with a propeller-type agitator was charged with 51.15 pounds of 52% formaldehyde, 31 pounds of phenol, and 2.5 pounds of barium oxide which had been dissolved in 1.3 gallons of water. The resulting charge was heated for a total of 10½ hours during which time it was stirred continuously. The charge was first heated to and maintained at a temperature of 100° F. for 2 hours, heated to and held at a temperature of 110° F. for 1½ hours, heated to and held at a temperature of 125° F. for 2 hours, and finally heated to and held at a temperature of 140° F. for approximately 5 hours or until a free formaldehyde content of 4.4% to 4.7% had been reached. The resole was then cooled to below 100° F. and neutralized with dilute (20% maximum) sulfuric acid to a pH of 7.3±0.1. The resole had a solids content of 45.5%, weighed 9.9 pounds per gallon and the cure time, determined as Stroke Cure [a] was 105 to 125 seconds. Infrared absorption analysis of the reaction mixture indicated that the resole was substantially free of unreacted phenol and also of methylene groups.

[a] Subsequently discussed.

The binder was prepared by mixing, with constant agitation, water and the ingredients in the order listed above. Water was added in a quantity sufficient to give a final solids content of about 15% by weight of the water solution.

After the binder was applied the continuous mat was passed into a curing oven and cured for approximately 3 minutes at a temperature of 410° F., thereby bonding the strands together at their points of contact. The porous cured mat weighed from ¾ oz. to 1¼ oz. per square foot and had approximately a 10% L.O.I. (loss on ignition).

After cure the mat was saturated with an oil modified cresol-phenolic resin (Catalin No. 6635) which was cured to the B stage, and thereafter a sandwich was formed by laying a plurality of mats on top of each other. The sandwich was then cured in a press for approximately 20 minutes at 325° F. to form a laminated product. Thereafter the laminated product was cut into sheets of the desired shape and size. The sheets had an apparent specific gravity of 1.3 to 2.0 as compared to water at 4° C.

In the size formulation set forth above, the 3,5-dimethyl-1-hexyn-3-ol serves to improve the wetting characteristics and decrease the surface tension of the size. The iso - octyl-phenoxy-polyoxyethylene ethanol also serves essentially the same function. The gamma-aminopropyltriethoxysilane facilitates bonding of the subsequently applied binder to the glass fibers. It also improves the moisture resistance, and to a degree, the electrical properties of the resin.

After extensive investigation it appears that the two wetting agents set forth above must be used to achieve the maximum electrical properties of the laminated product. Other coupling agents, however, can be used substituted for the preferred gamma-aminopropyltriethoxysilane.

It is preferred that the 3,5-dimethyl-1-hexyn-3-ol constituent constitute from about 20 to about 98% of the size, more preferably about 45 to about 50% and most desirably about 49%. It is also preferred that the iso-octyl-phenoxy-polyoxyethylene ethanol component constitute from about ½ to about 40%, more preferably about 1 to about 3%, and most desirably about 2%, and that the silane constitute from about 1 to about 75%, more preferably about 45 to about 50% and most desirably about 49%. The exact percentages are not critical, however. Preferably the silane and 3,5-dimethyl-1-hexyn-3-ol are present in major proportions, and the iso-octyl-phenoxy-polyoxyethylene ethanol is present in a minor proportion.

In making up the size the components are dissolved in water. They can be present in concentrations ranging from as low as ¼% solids to 3% solids by weight or higher in the water. Preferably, the size has a concentration of from about ¾% to about 1½% solids.

The chief components of the binder are the resin and the trimer acid.

The preferred resin for use in the binder is a phenol-formaldehyde condensate.[2] Other suitable resins include condensates of melamine, urea, and dicyandiamide with formaldehyde; co-condensates of phenol and urea, melamine, or dicyandiamide with formaldehyde; phenol-formaldehyde condensates extended with up to 50% of urea, melamine or dicyandiamide or mixtures thereof; and mixtures of the condensates, co-condensates and extended condensates.

The above mentioned resins are, in general, well-known to those skilled in the art.

The resin serves as the major and primary bonding constituent in the binder formulation. As previously stated it can be present in an amount ranging from 38 to 88%. It is preferably present in an amount ranging from about 50 to about 85%, and most desirably about 74%.

The trimer acid, the second major component of the binder composition, reacts with the resin to become a part of the cured resin binder film. It also imparts a greater degree of flexibility and toughness to the cured resin film, and gives a better hand and superior feel to the mat product. In addition, it functions as a release agent to prevent binder build-up on the oven conveyor chain and associated apparatus, and increases the stability and storage life of the mixed resin binder system. It is believed that metal cations are detrimental to the storage life of the binder, and that improved storage life is achieved because the acid acts as a sequestering agent for metal cations. An ancillary benefit when ammonium carbonate is present is that it reacts with the trimer acid to form the ammonium salt thereof. This also has a stabilizing effect on the binder.

The preferred trimer acid for use in this invention is prepared by the polymerization of unsaturated $C_{18}$ fatty

[2] Produced, for example, as described in Example I.

acids. It can be obtained under the trade name Empol 1043 Trimer Acid, and is made by the Emery Chemical Company, Cincinnati, Ohio. Empol 1043 Trimer Acid is essentially a mixture of tribasic and dibasic acids containing approximately 75–80% tribasic acid. The structure of trimer acid may be represented schematically as shown below. The structure includes three or more side chains represented as $R_1$, $R_2$ and $R_3$. Within the molecule, at X, are undetermined linkages formed during the polymerization of the three unsaturated fatty acid molecules that form trimer acid.

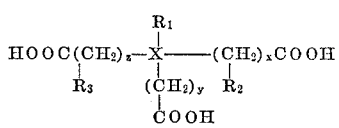

Tentative specifications and typical characteristics for Empol 1043 are listed in Table I:

TABLE I.—TENTATIVE SPECIFICATIONS AND TYPICAL CHARACTERISTICS

| Property | Tentative specification | Typical characteristics | Test methods |
| --- | --- | --- | --- |
| Acid Value | 188–196 | | ASTM D1980-61. |
| Saponification Value | 195–205 | | ASTM D1962-61. |
| Color, Gardner, max | 9 | | ASTM D1544-63T. |
| Iodine Value | | 100 | ASTM D1959-61. |
| Viscosity, cs. at 210° F | | 220 | ASTM D445-65. |
| Unsaponifiable, percent | | 0.5 | ASTM D1965-61. |
| Refractive Index, 25° C | | 1.4600 | ASTM D1218-61. |

Other suitable trimer acids are those which are prepared by the polymerization of unsaturated fatty acids having carbon chain lengths ranging from about 8 to about 16. Within the range previously set forth, the trimer acid is preferably present in the binder in quantities ranging from about 15 to about 40%, and most desirably about 24%.

Another essential ingredient of the binder system of this invention is the aminoalkylsilane. This agent is believed to serve the dual function of coupling the resin binder to the glass surface and to the subsequently applied saturating resin. It also gives moisture resistance and durability characteristics to the bonded mat.

The aminoalkylsilanes which are suitable for incorporation in the binder composition of the invention have the general formula, $R_n$—Si—$(-OR')_{(4-n)}$ wherein R is an aminoalkyl radical chemically bonded to the silicon atom, R' is an alkyl radical having from 1 to 4 carbon atoms, and $n$ is an integer from 1 to 3 inclusive. Optimum results have been achieved using gamma-aminopropyltriethoxysilane and N-beta-(aminoethyl)-gamma-aminopropyltrimethoxysilane. In the foregoing general formula, a preferred class of silanes is one wherein R has the formula $H_2N$—R'', and wherein R'' is an alkylene radical having from 2 to 6 carbon atoms. Another such preferred class is one wherein R has the formula $H_2N$—R''—NH—R''', wherein R'' and R''' are both alkylene radicals having from 2 to 6 carbon atoms.

The aminoalkylsilane is added to a mixing tank along with the other ingredients at the time of formulating the binder composition. The amount of the aminoalkylsilane added may range from about 1/10 to about 5%, preferably from about 1/10 to 1/2%, and most desirably, about 3/10%. When an aminoalkylsilane comes in contact with water, there is a tendency for at least partial hydrolysis to occur probably with the formation of a siloxane. It is to be understood that in the aqueous binder composition of the invention, both the aminoalkylsilane and its hydrolysis products are encompassed. Preferred silanes are obtained from the Dow Corning Corporation, Midland, Mich., and have the designation DC–Z–6020, Z–6024, DC–6034, DC–6025; also preferred is A–1100 obtained from the Union Carbide Corporation. The same silanes which can be used in the binder are also suitable for use in the size disclosed herein.

The methyl cellulose, while not absolutely essential to the operation of the binder of this invention, serves as a thickening agent and also aids the distribution of the binder on the cured mat. When used, it is present in quantities ranging from about 1/2% to 1%, and most preferably 6/10%.

Other adjuvants such as various fillers can be used if desired. They are not essential for the binder to be effective, however.

Ammonium sulfate is used in the binder when a resin made in accordance with the method set forth in Example I is used as the resin component i.e. where barium hydroxide or another fixed alkali is used as a condensing agent. The ammonium sulfate neutralizes any excess alkali cations. Ammonium sulfate is essential only with resins made using fixed alkali condensing agents. When used, ammonium sulfate preferably constitutes from about 2/10% to about 1% of the binder, most desirably about 1/2%.

A binder according to the invention must be substantially free of soluble ash: water-soluble residue after combustion of the binder. Many of the available condensates of phenol with formaldehyde are not suitable because they contain sufficient soluble ash, e.g. NaCl or $Na_2SO_4$, to be detrimental to the finished product, for example, by lowering the dielectric constant.

The binder composition is preferably adjusted, by the addition of ammonium hydroxide or the like, to a pH between 8 and 9 when it is mixed. The greatest stability and storage life are achieved at this pH.

Desirably, the binder composition is diluted with water and applied to the glass fibers in such a way that the binder comprises from about 8½% to about 11½% of the glass fiber mat product. The binder preferably constitutes about 9% to 11% of the mat product on a dry weight basis. At least about 8½% of binder is required for adequate bonding of the glass or other fibers so that the mat has structural integrity.

The size formulation of this invention is prepared by simply mixing the various components in the desired amount of water with substantially constant agitation.

Preferred saturating resins are thermosetting. The best electrical properties with mats having the size-binder system according to the invention have been achieved with epoxy, silicone, melamine and phenolic saturating resins.

The following example demonstrates that the process of this invention using the size and binder described herein enables production of glass fiber reinforced laminates having superior electrical properties.

Example II

Comparisons were made between 1/8 inch thick glass fiber laminates produced in accordance with the method of this invention, using the size-binder system set forth in Example I, and similar glass fiber laminates which were produced in essentially the same manner except that a binder was used that consisted of a phenol-formaldehyde resin plus other additives, and which contained no trimer acids.

The results of the test are set forth in Table I below, which presents the electrical properties of the laminates made with the prior art binder system (No. 1) compared with those made with the binder system of the invention (No. 2):

TABLE I

|  | (1) Dielectric Constant | | (2) Dissipation Factor | | (3) Dielectric Strength, volts/mil | |
|---|---|---|---|---|---|---|
|  | Condition A* | Condition B** | Condition A* | Condition B** | Condition A* | Condition B** |
| Samples: | | | | | | |
| No. 1*** | 3.64 | 4.14 | 0.0359 | 0.0875 | 608 | 374 (38%) |
| No. 2**** | 3.52 | 3.58 | 0.0169 | 0.0203 | 707.6 | 659 (7%) |

*Condition A, Unconditioned sample (as produced).
**Condition B, Measured after sample was submersed in distilled water for 24 hours at 23° C.
***Represents an average of 6 individual samples.
****Represents an average of 6 individual samples.

NOTE:
(1) The dielectric constant of a laminate should be in the range of 3 to 5.
(2) Dissipation Factor is the value of the power absorbed by the sample, usually in the form of heat energy. The lower the dissipation factor of a sample, the better its performance as an insulator.
(3) Dielectric strength is the ability of a laminate to withstand applied voltage and retain its properties as an insulator.

By examining the above table it can be seen that the dielectric constant of the laminate made with the phenolic-trimer acid binder-size system of the invention (Sample No. 2) did not change appreciably after the B conditioning, whereas the dielectric constant of the control sample (Sample No. 1) showed an appreciable increase after the B conditioning. The dissipation factor of Sample No. 2 increased slightly after the B conditioning, while the dissipation factor of Sample No. 1 increased by a factor of approximately 2.5. The dielectric strength of Sample No. 2 decreased 7% on the average after the B conditioning while Sample No. 1 showed a 38% decrease on the average after the B conditioning.

It can thus be seen that glass fiber laminates produced in accordance with the method of the invention exhibit superior electrical properties over those produced in accordance with the prior art.

It will be apparent that various changes and modifications can be made from the details of the invention as disclosed herein without departing from the scope and spirit of the attached claims.

What I claim is:
1. In a glass fiber mat comprising a porous mass of intermeshed glass fibers bonded together at their points of contact, the improvement of a size-binder system comprising an aqueous size composition comprising
   from 20% to 98% of 3,5-dimethyl-1-hexyn-3-ol
   from 5/10% to 40% of iso-octyl-phenoxy-polyoxyethylene ethanol, and
   from 1% to 75% of an aminoalkylsilane; and an aqueous binder composition comprising
   from 38% to 88% of a synthetic resin which is substantially free of soluble ash and which is selected from the group consisting of condensates of phenol, melamine, urea, and dicyandiamide with formaldehyde; co-condensates of phenol and urea, melamine, or dicyandiamide with formaldehyde; and phenol-formaldehyde condensates extended with up to 50% of urea; melamine, dicyandiamide, or mixtures thereof; and mixtures of the condensates, co-condensates and extended co-condensates;
   from 10% to 58% of a trimer acid, and
   from 1/10% to 5% of an aminoalkylsilane.
2. The glass fiber mat of claim 1 wherein said size composition comprises an aqueous solution of
   49% of 3,5-dimethyl-1-hexyn-3-ol
   2% iso-octyl-phenoxy-polyoxyethylene ethanol
   49% of gamma-aminopropyltriethoxysilane and said binder comprises an aqueous dispersion of
   74% of a phenolic resole
   24% of a trimer acid
   3/10% of N-beta-(aminoethyl)-gamma-aminopropyltrimethoxysilane
   6/10% methyl cellulose, and
   ½% ammonium sulfate.
3. A laminated product comprising superposed layers of the resin saturated glass fiber mat of claim 1 compressed into a dense, solid structure.
4. The glass fiber mat of claim 1 wherein said binder composition comprises an aqueous dispersion of
   from 50% to 85% of a phenolic resole
   from 15% to 40% of a trimer acid
   from 1/10% to 5/10% of an aminoalkylsilane
   from 5/10% to 1% of methyl cellulose, and
   from 2/10% to 1% of ammonium sulfate.

References Cited

UNITED STATES PATENTS

| 3,042,544 | 7/1962 | Marzocci | 117—126GS |
| 3,322,702 | 5/1967 | Smucker et al. | 260—19A |
| 3,341,356 | 9/1967 | Collier | 117—161ZA |
| 3,380,877 | 4/1968 | Smucker et al. | 117—126GS |

ROBERT F. BURNETT, Primary Examiner

R. O. LINKER, Jr., Assistant Examiner

U.S. Cl. X.R.

117—126, 161; 156—167; 260—19